United States Patent [19]
Takami et al.

[11] Patent Number: 6,162,343
[45] Date of Patent: Dec. 19, 2000

[54] METHOD OF PREPARING HARD DISC INCLUDING TREATMENT WITH AMINE-CONTAINING ZINCATE SOLUTION

[75] Inventors: Hideyuki Takami; Masahiro Nozu; Yuki Adachi; Mika Fukuya, all of Hirakata, Japan

[73] Assignee: C. Uyemura & Co., Ltd., Osaka, Japan

[21] Appl. No.: 09/184,078

[22] Filed: Nov. 2, 1998

Related U.S. Application Data

[63] Continuation-in-part of application No. 08/835,469, Apr. 8, 1997, abandoned.

[30] Foreign Application Priority Data

Jun. 11, 1996 [JP] Japan ..................................... 8-171896

[51] Int. Cl.⁷ ...................................................... C25D 5/02
[52] U.S. Cl. .............................. 205/119; 205/185; 205/85
[58] Field of Search ..................................... 205/119, 118, 205/602, 85, 185; 106/1.29, 125

[56] References Cited

U.S. PATENT DOCUMENTS

| | | |
|---|---|---|
| 3,216,835 | 11/1965 | Saubestre ..................................... 106/1 |
| 3,650,803 | 3/1972 | Lin ........................................... 117/47 A |
| 3,989,606 | 11/1976 | Kampert ....................................... 204/33 |
| 4,632,857 | 12/1986 | Mallory, Jr. ............................... 428/209 |
| 4,659,605 | 4/1987 | Malik et al. .............................. 427/129 |
| 5,182,006 | 1/1993 | Haydn et al. ............................. 205/213 |

FOREIGN PATENT DOCUMENTS

| | | | |
|---|---|---|---|
| 361087221 | 10/1984 | Japan ................................ | G11B 5/84 |
| 363053719 | 8/1986 | Japan ................................ | G11B 5/84 |

*Primary Examiner*—Kishor Mayekar
*Attorney, Agent, or Firm*—Sughrue, Mion, Zinn, Macpeak & Seas, PLLC

[57] ABSTRACT

A method of preparing a hard disc comprising steps of:

immersing an aluminum or aluminum alloy substrate in a zincate solution containing a zinc compound, an alkali hydroxide, and at least one amine to thereby form a zincate film on the surface of the substrate, immersing the zincate film-formed substrate in an electroless nickel plating solution comprising a water-soluble nickel salt, a complexing agent, and a hypophosphite to thereby form a nickel—phosphorus alloy layer on the surface of the zincate film-coated substrate, and forming a magnetic layer on the nickel—phosphorus alloy layer.

2 Claims, No Drawings

METHOD OF PREPARING HARD DISC INCLUDING TREATMENT WITH AMINE-CONTAINING ZINCATE SOLUTION

CROSS REFERENCE TO RELATED APPLICATION

This application is a continuation-in-part of application Ser. No. 08/835,469 filed on Apr. 8, 1997, now abandoned the entire contents of which are hereby incorporated by reference.

BACKGROUND OF THE INVENTION

1. Field of the Invention

This invention relates to a method of preparing a hard disc.

2. Prior Art

In the prior art, hard discs are generally manufactured by forming a nickel—phosphorus (Ni—P) coating on a surface of an aluminum or aluminum alloy substrate from an electroless nickel—phosphorus plating bath containing hypophosphorous acid or a salt thereof as a reducing agent. Prior to the formation of a Ni—P film, the substrate must be subject to zinc immersion coating or zinc replacement treatment to form a zincate film on the substrate surface.

Conventional immersion zincate solutions contain zinc compounds and alkali hydroxides. When immersion zinc coating is carried out using such zincate solutions, there is deposited a zincate film consisting of thick and thin portions and presenting uneven surface topography which is sometimes referred to as zinc replacement variation. Then an electroless Ni—P coating formed subsequent to the zincating treatment presents a surface of the same topography as the zincate film. This plating variation is created by a collection of nodules. Even after polishing, the area of plating variation can be left as an area having minute projections of the order of 20 to 50 nm. As the recording density of hard discs increases, such minute projections become a bar.

It is thus desired to preclude plating variation which would occur when a Ni—P film is formed on an aluminum or aluminum alloy substrate from an electroless plating bath, that is, to preclude zinc replacement variation causing such plating variation.

SUMMARY OF THE INVENTION

Therefore, an object of the present invention is to provide a method of preparing a hard disc in which a novel and improved zincate solution can form a zincate film on an aluminum base substrate while minimizing zinc replacement variation.

We have found that by blending an amine such as ethylene diamine and triethanolamine in an immersion zincate solution comprising a zinc compound and an alkali hydroxide as major components, there is formed an even zinc film in which zinc replacement variation is significantly suppressed. When electroless Ni—P plating is subsequently carried out on such an even zincate film, a uniform Ni—P film without variation is obtained.

Therefore, the present invention provides a method of preparing a hard disc comprising steps of:

immersing an aluminum or aluminum alloy substrate in a zincate solution containing a zinc compound, an alkali hydroxide, and at least one amine to thereby form a zincate film on the surface of the substrate, immersing the zincate film-formed substrate in an electroless nickel plating solution comprising a water-soluble nickel salt, a complexing agent, and a hypophosphite to thereby form a nickel—phosphorus alloy layer on the surface of the zincate film-coated substrate, and forming a magnetic layer on the nickel—phosphorus alloy layer.

DETAILED DESCRIPTION OF THE INVENTION

The immersion zincate solution used in the present invention contains a zinc compound and an alkali hydroxide in water.

The zinc compound used herein includes zinc oxide, zinc nitrate, zinc chloride, zinc sulfate, and zinc acetate. They may be used alone or in admixture of two or more. The amount of the zinc compound used is preferably 0.02 to 0.6 mol/liter, more preferably 0.05 to 0.4 mol/liter of zinc.

The alkali hydroxide used herein includes sodium hydroxide and potassium hydroxide, with sodium hydroxide being preferred. The amount of the alkali hydroxide used is preferably 1 to 8 mol/liter, more preferably 2 to 5 mol/liter.

According to the invention, one or more amines are added to the zincate solution for suppressing zinc replacement variation, which is effective for assisting subsequent electroless plating of an even Ni—P film.

Examples of the amine used herein include ethylene diamine, diaminopropane, diaminobutane, N,N,N,N-tetramethyldiaminomethane, dimethylethylenediamine, diethylene triamine, 3,3-iminobispropylamine, triethylene tetramine, N,N-bis(3-aminopropyl)ethylene diamine, monoethanolamine, diethanolamine, triethanolamine, N-methylhydroxyamine, N,N-diethylhydroxyamine, 3-amino-1-propanol, and N-methylethanolamine, alone or in admixture of two or more.

The amount of the amine blended is preferably 0.007 to 0.7 mol/liter, especially 0.02 to 0.4 mol/liter. With less than 0.007 mol/liter of the amine, the resulting zincate film would be less uniform and hence, subsequent electroless plating would result in a less uniform Ni—P film. More than 0.7 mol/liter of the amine would cause the substrate surface to be whitened.

In the zincate solution according to the invention, there may be blended 0.001 to 0.3 mol/liter of at least one of water-soluble salts of iron, nickel and copper and 0.003 to 0.3 mol/liter of a complexing agent such as sodium tartrate and Rochelle salt, if necessary.

Furthermore, pyrocatechol, hydroquinone and other optional additives may be blended in the zincate solution according to the invention whereby a subsequently formed electroless Ni—P coating is further improved in uniformity and luster.

Zincating treatment in the zincate solution according to the invention may be carried out under any desired conditions although a temperature of 10 to 40° C. is preferred. A zincate film formed at temperatures below 10° C. would be less adherent to an overlying nickel deposit whereas temperatures above 40° C. would roughen the surface of an aluminum or aluminum alloy substrate.

If desired, zincating treatment may be repeated twice or more. It is preferred to repeat zincating treatment twice or more especially in the manufacture of hard discs. In such an embodiment, operation may be carried out in accordance with a conventional process. Usually, primary zincating treatment is followed by water washing, immersion in a nitric acid solution, and secondary zincating treatment.

In the present invention, a nickel—phosphorus plating layer (Ni—P layer) is formed on the aluminum or aluminum alloy substrate on which a zincate film has been formed using an immersion zincate solution by immersing the zincate film-formed substrate in an electroless nickel plating solution.

The electroless nickel plating solution contains a water-soluble nickel salt such as nickel sulfate and nickel chloride, a complexing agent, and a hypophosphite such as sodium hypophosphite. If necessary, the plating solution further contains a pH adjusting agent, a stabilizer, and other additives. The concentration of the water-soluble nickel salt may be 0.02 to 0.2 mol/liter; and the concentration of hypophosphite may be 0.1 to 0.5 mol/liter, if the resulting Ni—P layer is a non-magnetic even after heat treating the Ni—P layer at 290° C. for 2 hours, and is to contain 11.5 to 12.5% by weight of phosphorus and the remaining of nickel.

Preferred examples of the complexing agent include (1) acetic acid, lactic acid, and other organic acids and their salts in which the coordinating atom is oxygen, (2) thioglycolic acid, cysteine and other compounds in which the coordinating atom is sulfur, and (3) ammonia, glycine, ethylenediamine and other compounds in which the coordinating atom is nitrogen. The concentration (in mol) of the complexing agent may be equal to or higher than the concentration (in mol) of the total metal salts. The plating solution may have pH of 4 to 5, and the plating temperature may be 40 to 90° C.

In accordance with this invention, the thickness of the Ni—P layer may be properly selected; but usually it is 0.1 to 50 μm, preferably 10 to 30 μm.

The electroless nickel plating solution may be commercially available.

After the completion of the Ni—P electroless plating, the Ni—P layer may preferably be subjected to lapping and/or polishing so that the surface of Ni—P layer becomes smooth and even.

On the Ni—P layer, the magnetic layer is formed by a well-known method. Examples of the magnetic layers are γ-$Fe_2O_3$ layer, a Co—Ni layer, a Co—Cr layer, a Co—P layer, a Co—Ni—P layer, etc. The layer may usually be formed by a vapor deposition method which includes a sputtering, electroless plating method, an electroplating method or a coating method, depending on the type of the magnetic layer to be formed. In the present invention, a vapor deposition method such as sputtering can be usefully employed for the formation of a magnetic layer, such as a γ-$Fe_2O_3$ layer, a Co—Ni layer, a Co—Cr layer or the like. Such a layer can effectively be formed as the magnetic layer by sputtering. The thickness of the magnetic layer is not limited, but is usually in the range of 100 Å to 1 μm.

The magnetic layer may preferably be covered with a protective layer. It can be any known layers such as inorganic layers which include $SiO_2$, carbon, Cr—C, rhodium, etc. and organic layers. In the formation of the protective layer, vapor deposition methods such as sputtering, which is carried out at temperatures of 200° C. or higher, can also be employed. Layers such as a $SiO_2$ layer, a carbon layer, a Cr—C layer or the like can effectively be formed by sputtering. The thickness of the protective layer is not limited, but is usually in the range of 0.05 to 0.5 μm.

EXAMPLE

Examples of the present invention are given below by way of illustration and not by way of limitation.

Examples 1–10 and Comparative Examples 1–3

An immersion zincate solution of the following composition was used. An aluminum substrate was degreased and etched in a conventional manner, immersed in a 30% aqueous solution of nitric acid at 25° C. for 30 seconds, immersed in the zincate solution for zinc replacement, further immersed in the 30% aqueous solution of nitric acid at 25° C. for 60 seconds, and immersed again in the zincate solution for zinc replacement. Thereafter, electroless Ni—P plating was carried out to deposit a Ni—P film of 15 μm thick on the substrate. Both the primary and secondary zincate treatments were done at 25° C. for 30 seconds.

| Example 1 | |
|---|---|
| Sodium hydroxide | 3.0 mol/l |
| Zinc oxide | 0.25 mol/l |
| Rochelle salt | 0.25 mol/l |
| Ferric (III) chloride | 0.01 mol/l |
| Sodium nitrate | 0.01 mol/l |
| Ethylenediamine | 0.20 mol/l |
| Pyrocatechol | 0.10 mol/l |

| Example 2 | |
|---|---|
| Sodium hydroxide | 4.0 mol/l |
| Zinc oxide | 0.30 mol/l |
| Rochelle salt | 0.50 mol/l |
| Ferric (III) chloride | 0.02 mol/l |
| Sodium nitrate | 0.01 mol/l |
| Triethanolamine | 0.10 mol/l |
| Hydroquinone | 0.10 mol/l |

| Example 3 | |
|---|---|
| Sodium hydroxide | 4.50 mol/l |
| Zinc oxide | 0.10 mol/l |
| Rochelle salt | 0.10 mol/l |
| Ferric (III) chloride | 0.10 mol/l |
| Sodium nitrate | 0.05 mol/l |
| Diaminobutane | 0.05 mol/l |

| Example 4 | |
|---|---|
| Sodium hydroxide | 2.50 mol/l |
| Zinc oxide | 0.15 mol/l |
| Rochelle salt | 0.20 mol/l |
| Ferric (III) chloride | 0.005 mol/l |
| Sodium nitrate | 0.10 mol/l |
| Diaminopropane | 0.30 mol/l |

| Example 5 | |
|---|---|
| Sodium hydroxide | 3.0 mol/l |
| Zinc oxide | 0.20 mol/l |
| Rochelle salt | 0.30 mol/l |
| Ferric (III) chloride | 0.01 mol/l |
| Sodium nitrate | 0.20 mol/l |
| Dimethylethylenediamine | 0.40 mol/l |

| Example 6 | |
|---|---|
| Sodium hydroxide | 3.0 mol/l |
| Zinc oxide | 0.10 mol/l |
| Sodium tartrate | 0.10 mol/l |
| Ferric (III) chloride | 0.001 mol/l |
| Sodium nitrate | 0.01 mol/l |
| Monoethanolamine | 0.05 mol/l |

| Example 7 | |
|---|---|
| Sodium hydroxide | 4.0 mol/l |
| Zinc oxide | 0.15 mol/l |
| Sodium tartrate | 0.20 mol/l |
| Ferric (III) chloride | 0.02 mol/l |
| Sodium nitrate | 0.02 mol/l |
| Diethanolamine | 0.10 mol/l |

| Example 8 | |
|---|---|
| Sodium hydroxide | 4.50 mol/l |
| Zinc oxide | 0.25 mol/l |
| Sodium tartrate | 0.30 mol/l |

-continued

|  |  |  |
|---|---|---|
| Ferric (III) chloride | 0.05 | mol/l |
| Sodium nitrate | 0.05 | mol/l |
| 3-amino-1-propanol | 0.20 | mol/l |
| Example 9 | | |
| Sodium hydroxide | 2.50 | mol/l |
| Zinc oxide | 0.30 | mol/l |
| Sodium tartrate | 0.40 | mol/l |
| Ferric (III) chloride | 0.002 | mol/l |
| Sodium nitrate | 0.10 | mol/l |
| Triethylenetetramine | 0.30 | mol/l |
| Example 10 | | |
| Sodium hydroxide | 3.0 | mol/l |
| Zinc oxide | 0.40 | mol/l |
| Sodium tartrate | 0.50 | mol/l |
| Ferric (III) chloride | 0.20 | mol/l |
| Sodium nitrate | 0.20 | mol/l |
| N-methylethanolamine | 0.40 | mol/l |
| Comparative Example 1 | | |
| Sodium hydroxide | 3.0 | mol/l |
| Zinc oxide | 0.25 | mol/l |
| Rochelle salt | 0.25 | mol/l |
| Ferric (III) chloride | 0.01 | mol/l |
| Sodium nitrate | 0.01 | mol/l |
| Comparative Example 2 | | |
| Sodium hydroxide | 2.0 | mol/l |
| Zinc oxide | 0.20 | mol/l |
| Sodium tartrate | 0.20 | mol/l |
| Ferric (III) chloride | 0.01 | mol/l |
| Sodium nitrate | 0.02 | mol/l |
| Comparative Example 3 | | |
| Sodium hydroxide | 4.0 | mol/l |
| Zinc oxide | 0.30 | mol/l |
| Sodium tartrate | 0.30 | mol/l |
| Ferric (III) chloride | 0.02 | mol/l |
| Sodium nitrate | 0.05 | mol/l |
| Electroless Ni-P plating composition and conditions | | |
| Nickel sulfate | 0.1 | mol/l |
| Sodium malate | 0.2 | mol/l |
| Sodium acetate | 0.2 | mol/l |
| Sodium hypophosphite | 0.2 | mol/l |
| Lead nitrate | 1.0 | ppm |
| pH | 4.7 | |
| Plating temperature | 90° C. | |

The thus obtained electroless Ni—P coatings were examined for outer appearance for detecting any unevenness. When the zincate solutions of Examples 1 to 10 were used, even Ni—P films were obtained. When the zincate solution of Comparative Examples 1 to 3 were used, uneven plating occurred.

|  | Plating variation |
|---|---|
| Examples 1 to 10 | none |
| Comparative Examples 1 to 3 | found |

It was thus confirmed that by adding an amine such as ethylene diamine and triethanolamine to a zincate solution, there is formed a zincate film of sufficient uniformity to allow a Ni—P film having a uniform surface to be subsequently deposited from an electroless plating bath.

Immersion of an aluminum substrate in a zincate solution according to the invention permits subsequent electroless Ni—P plating to form a Ni—P film without unevenness. The Ni—P film can be polished to an extremely smoother surface than conventional Ni—P films, contributing to the increased recording density of hard discs, when a magnetic layer is formed thereon.

What is claimed is:

1. A method of preparing a hard disc comprising steps of:

immersing an aluminum or aluminum alloy substrate in a zincate solution containing a zinc compound in an amount of 0.02 to 0.6 mol/liter, an alkali hydroxide in an amount of 1 to 8 mol/liter, and at least one amine selected from the group consisting of ethylene diamine, diaminopropane, diaminobutane, N,N,N,N-tetramethyldiaminomethane, dimethylethylenediamine, diethylene triamine, 3.3-iminobispropylamine, triethylene tetramine, N,N-bis(3-aminopropyl)ethylene diamine, monoethanolamine, diethanolamine, triethanolamine, N-methylhydroxyamine, N,N-diethylhydroxyamine, 3-amino-1-propanol, and N-methylethanolamine in an amount of 0.007 to 0.7 mol/liter to thereby form a zincate film on the surface of the substrate, immersing the zincate film-formed substrate in an electroless nickel plating solution comprising a water-soluble nickel salt, a complexing agent, and a hypophosphite to thereby form an even nickel—phosphorous alloy layer on the surface of the zincate film-coated substrate without an area having minute protection of order of 20 to 50 nm, and forming a magnetic layer on the nickel—phosphorus alloy layer.

2. The method of claim 1 wherein the zincate solution is kept at a temperature of 10 to 40° C.

\* \* \* \* \*